(12) United States Patent
Gray et al.

(10) Patent No.: US 8,374,169 B2
(45) Date of Patent: Feb. 12, 2013

(54) SYSTEM AND METHOD FOR TRANSITION OF ASSOCIATION BETWEEN COMMUNICATION DEVICES

(75) Inventors: Thomas A. Gray, Mansfield (CA); Sonya Fullarton, Ottawa (CA); James N. Davies, Amprior (CA); Christian Szpilfogel, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1054 days.

(21) Appl. No.: 12/321,857

(22) Filed: Jan. 26, 2009

(65) Prior Publication Data
US 2010/0189094 A1    Jul. 29, 2010

(51) Int. Cl.
    *H04L 12/66* (2006.01)
(52) U.S. Cl. ...................................... 370/352
(58) Field of Classification Search .......... 370/351–356, 370/395.5–395.52, 400–401, 522; 379/201.01–201.03; 455/417; 709/227–229
    See application file for complete search history.

(56) References Cited

U.S. PATENT DOCUMENTS

| 5,454,032 A | 9/1995 | Pinard et al. |
| 6,163,692 A | 12/2000 | Chakrabarti et al. |
| 2002/0160810 A1* | 10/2002 | Glitho et al. ................ 455/560 |
| 2004/0039847 A1 | 2/2004 | Persson et al. |
| 2004/0153875 A1 | 8/2004 | Amyot et al. |
| 2005/0141691 A1 | 6/2005 | Wengrovitz |
| 2006/0256751 A1 | 11/2006 | Jagadeesan et al. |
| 2008/0181106 A1* | 7/2008 | Bertagnole et al. ........ 370/230.1 |
| 2010/0267364 A1* | 10/2010 | Smith et al. ................... 455/410 |
| 2011/0194556 A1* | 8/2011 | Butler et al. ................... 370/389 |

OTHER PUBLICATIONS

Wu et al, Less: Language for End System Services in Internet Telephony draft-wu-iptel-less-00, Internet-Draft, 142 pages, 2005.*
Wu et al, Feature Interactions in Internet Telephony End Systems, Columbia University, 18 pages, 2004.*
Jiang, Internet Telephony Services for Presence With SIP and Extended CPL, Thesis, University of Ottawa, 157 pages, 2003.*
"CallDesk—A Thin-client Agent Desktop" Marketing White-paper; Lakshya . . . The Missing Link; Oct. 20, 2007; Arindam Chakravorty for Lakshya Solutions Limited / India.
Guerin, Marcel "Using Solaris Resource Manager With Sun Ray" Sun BluePrints OnLine—Sun Microsystems, Inc., Jun. 2004, Santa Clara, CA.
"This Just In: U.S. Cell Phone Users on the Move Are Talking, Not Typing" Callwave Investor Relations, Dec. 16, 2004, Santa Barbara, CA.
"Using Smart Cards With the Sun Ray 1 Enterprise Applicance" A Customer Brief; Sun Microsystems, Inc., Sep. 1999, Palo Alto, CA.

* cited by examiner

Primary Examiner — Frank Duong (57) ABSTRACT

A system and method of providing an assignable registration between a device and a user for IP telephony, wireless telephony and other forms of collaborative systems is provided wherein loss of association is detected and a policy language is used to capture and execute user preferences in the event of such loss. A method and system are also provided for utilizing coupling between a thin client and a telephone to provide for device association.

26 Claims, 6 Drawing Sheets

SYSTEM AND METHOD FOR TRANSITION OF ASSOCIATION BETWEEN COMMUNICATION DEVICES

FIELD OF INVENTION

The specification relates generally to networked devices, and specifically to a method and system for transition of association between communication devices.

BACKGROUND OF INVENTION

Personal mobility is a hallmark of modern communications. For example, associations may be provided between networked devices and other types of collaborative systems, such as IP phones, thin clients, PCs/laptops using "hot desking" and wireless access to provide user selected dynamically associated features and preferences via a physical piece of hardware (i.e. device) that connects the user to the network.

It is important that users be able to maintain connectivity as they move through different environments during the course of day-to-day activities. The ability to create associations between a user and a device by means of hot desking, IP telephone registration, local wireless and cellular service registration etc. is well known. However the expected behavior of an existing call, or other collaborative session, in circumstances where an association is terminated, remains undefined. For example, in the case of hot desking, if an association between device and user is ended but a call involving that device and user is still active, conventional IP systems will maintain the current call on the same device thereby coupling the association of the call with the device, whereas it is possible that the user may want the call to proceed on another device if the association is terminated.

As but one example, a user may be involved in a call on a device in one location (e.g. a meeting room) and during the course of the call may wish to move to another location (e.g. office desk) to be able to access other information or personnel. It is not presently possible for the user to end his/her association with the device, move to another device and register on the new device while maintaining his/her current call throughout the transition. The foregoing is an example of a user-initiated, controlled transition of association.

However, there are also cases in which a transition or loss of association is uncontrolled. For example, in IP telephony it is possible for a device in the underlying access network linking a device to the backbone network to cause the association to fail. Also, loss of association may occur between WiFi and DECT devices connected to an in-building wireless system as a result of the user entering a wireless dead zone or moving out of range of a wireless antenna.

It would be desirable in such situations for a user to indicate his/her preferences on how such losses of association are to be dealt with (i.e. as an alternative to dropping the call). Moreover, it would be desirable to provide a mechanism by which a user may indicate preferences on how call association should be maintained for both controlled and uncontrolled transitions of association, and a mechanism to implement these preferences.

It is common in IP telephony systems to provide user proxies for applying user-selected features and preferences to incoming calls. Proxies function to direct incoming calls to an endpoint that is most in compliance with declared user preferences. For purposes of mobility, users are able to register a number of endpoints at which they can be reached. Existing technologies, such as CPL (Call Processing Language), permit a user to specify preferences for the handling of incoming calls. CPL is a network protocol agnostic (described in RFC3880), commonly used in conjunction with SIP (Session Initiation protocol), and uses an XML mark up language that allows a user to specify the handling of incoming and outgoing calls. The user can specify conditions on classes of offered calls (as indicated by SIP address, time of day, etc) and CPL uses these classes to direct the calls to certain endpoints. It is also known to couple CPL to a policy system for allowing user-control in a more straightforward manner through the use of structured English sentences.

Table 1 is reproduced from the CPL RFC (RFC 3880, FIG. 2), as follows:

TABLE 1

```
<?xml version="1.0" encoding="UTF-8"?>
  <cpl xmlns="urn:ietf:params:xml:ns:cpl"
    xmlns:xsi="http://www.w3.org/2001/XMLschema-instance"
    xsi:schemaLocation="urn:ietf:params:xml:ns:cpl cpl.xsd ">
    <subaction id="voicemail">
      <location url="sip:jones@voicemail.example.com">
        <redirect />
      </location>
    </subaction>
    <incoming>
      <address-switch field="origin" subfield="host">
        <address subdomain-of="example.com">
          <location url="sip:jones@example.com">
            <proxy timeout="10">
              <busy> <sub ref="voicemail" /> </busy>
              <noanswer> <sub ref="voicemail" /> </noanswer>
              <failure> <sub ref="voicemail" /> </failure>
            </proxy>
          </location>
        </address>
        <otherwise>
          <sub ref="voicemail" />
        </otherwise>
      </address-switch>
    </incoming>
</cpl>
```

The CPL script of Table 1 uses an address switch to determine if an incoming caller is from the "example.com" domain. If so, the call is proxied to the endpoint identified by the SIP address jones@example.com. If that call fails, or goes to busy or times out after 10 seconds, the call is directed to the user's voicemail. For all other callers (i.e. those not from example.com), the CPL script provides no specification for call disposition and so the default behavior of the proxy is followed.

There is no provision in the SIP specifications (RFC3251) or CPL that addresses the situation where the device on which a call is being conducted loses its registration. However, as indicated above, in the very similar case of a conventional PBX hot desking feature, if the hot desk registration is withdrawn during the time that a call is active, it is common to maintain the call on the current device until a disconnect signal is received. This default call handling assumes that the user will remain at the device and will wish to continue the call on the device. However, as discussed above, this assumption is not valid in many cases of controlled or uncontrolled loss of association such that default call handling may not adequately serve the user in such situations.

BRIEF SUMMARY OF THE INVENTION

In general, a system for transitioning an association between a user and a first communication device involved in a call to at least one other communication device is disclosed. The system includes a generated signal in the event of a loss of association in mid-call, and an application server for receiving the signal and in response transitioning the association to a second communication device. The application server includes an execution engine and a policy document for storing and executing user call handling preference scripts upon receiving the signal. The policy document includes a mid-call element for delimiting user preferences for handling of events during the mid-call state, an event element for representing any one of a plurality of defined mid-call events, a location element for identifying the second communication device, and a move element for transitioning the association from the first communication device to the second communication device specified by the location element.

In another general embodiment, a system includes a thin client server, a thin client device connected to the thin client server, at least one telephone collocated with the thin client device, a PBX connected to the thin client server and to which the telephone is connected, and a feature adjunct connected to the PBX and the thin client server. In addition, the system includes a card reader on the thin client device to receive a user card for one of either registering a user with the thin client server in response to which the thin client server registers the user on the thin client device and causes the PBX to register the user on the telephone, or registering the user with the PBX which in response registers the user on the thin client device. The system further includes an application server within one of the PBX and the adjunct for storing and executing user call handling preferences in the event of a loss of association during a mid-call state between the collocated telephone and the thin client device and at least one further communication device coupled to the PBX, to transition said association to a second communication device.

BRIEF DESCRIPTION OF THE DRAWINGS

Exemplary prior art and embodiments are described with reference to the following figures, in which.

DETAILED DESCRIPTION OF THE EMBODIMENTS

Figure 1:
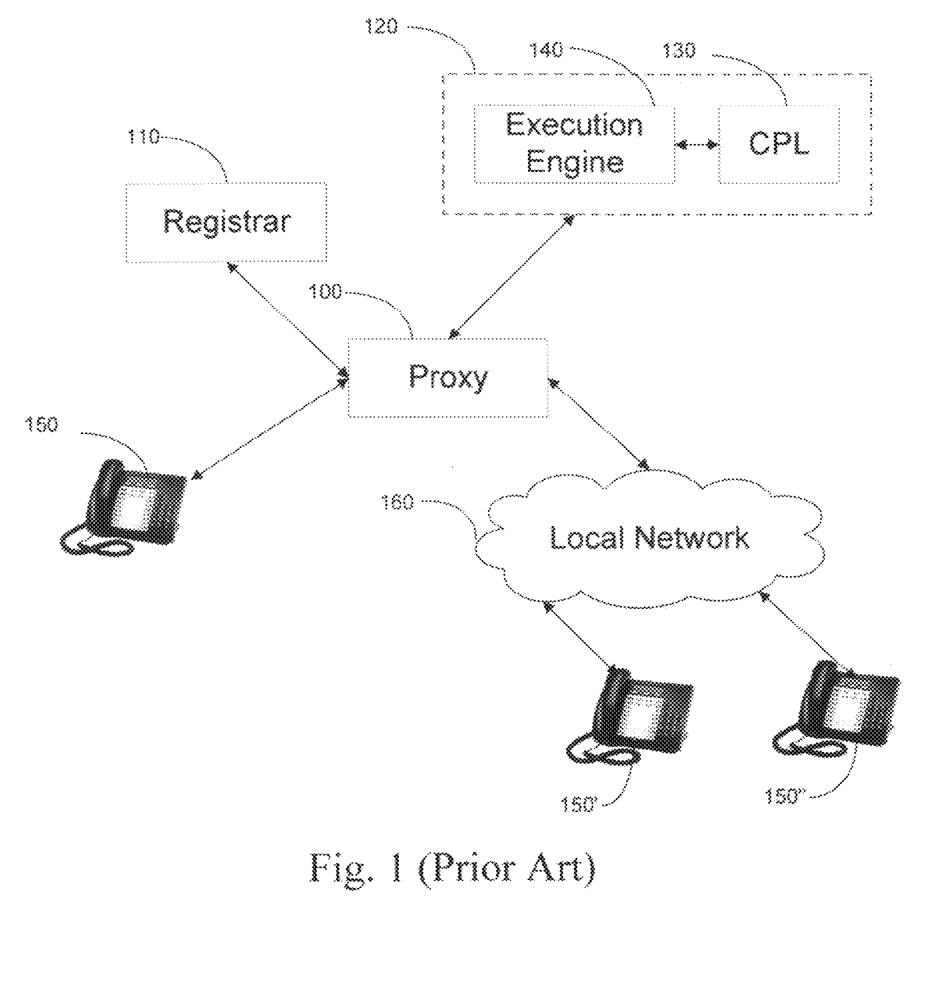
FIG. 1 depicts a prior art system for associating networked communication devices using CPL with SIP.

The typical configuration for the use of CPL with SIP is shown in FIG. 1. A proxy 100 is configured to work in conjunction with a registrar 110 and an application server 120. The application server 120 includes a processor and memory for implementing a user CPL document 130 and CPL execution engine 140. A user is able to register multiple devices, such as device 150, with registrar 110. A user is also able to add tags to these registrations to indicate the characteristics of the device for governing the type of calls that that can be accepted by the device from the network 160. For example, the user can identify the type of media (e.g. audio, video, etc.) that the device can handle; whether the device is to be used for business or personal use; whether it is fixed or mobile, and so on. It is also possible that the device 150 can provide such tags with information provided by the manufacturer or programmed by a network administrator/manager. The proxy 100 provides default behaviour for matching an incoming call INVITE to the most suitable endpoint on network 160 (e.g. other network devices 150', 150'', etc.). The calling user may populate his/her INVITE message with ACCEPT-CONTACT and REJECT-CONTACT headers that indicate the types of endpoints that he/she either will or will not accept. The default behaviour of proxy 100 matches the caller preferences to the types of user devices, for example as discussed above in connection with Table 1.

Figure 2A:
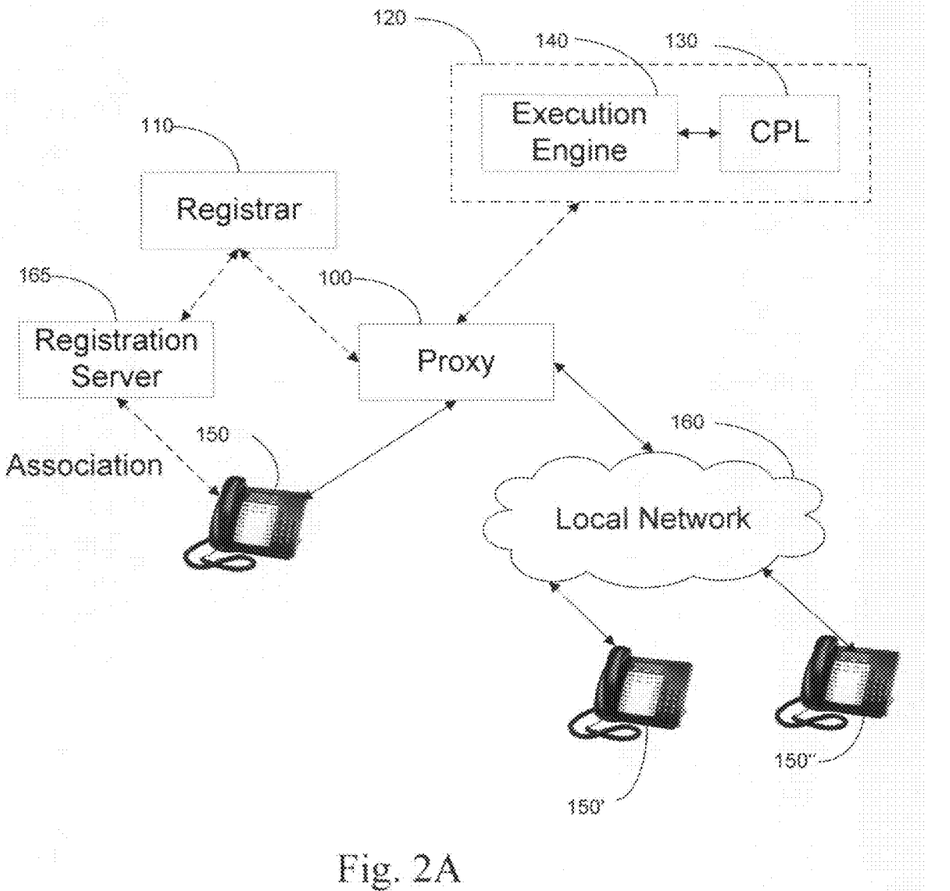
FIG. 2A is a block diagram showing a system for handling loss of association applied to local hot desking or IP telephone registration, according to an exemplary embodiment.
Figure 2B:
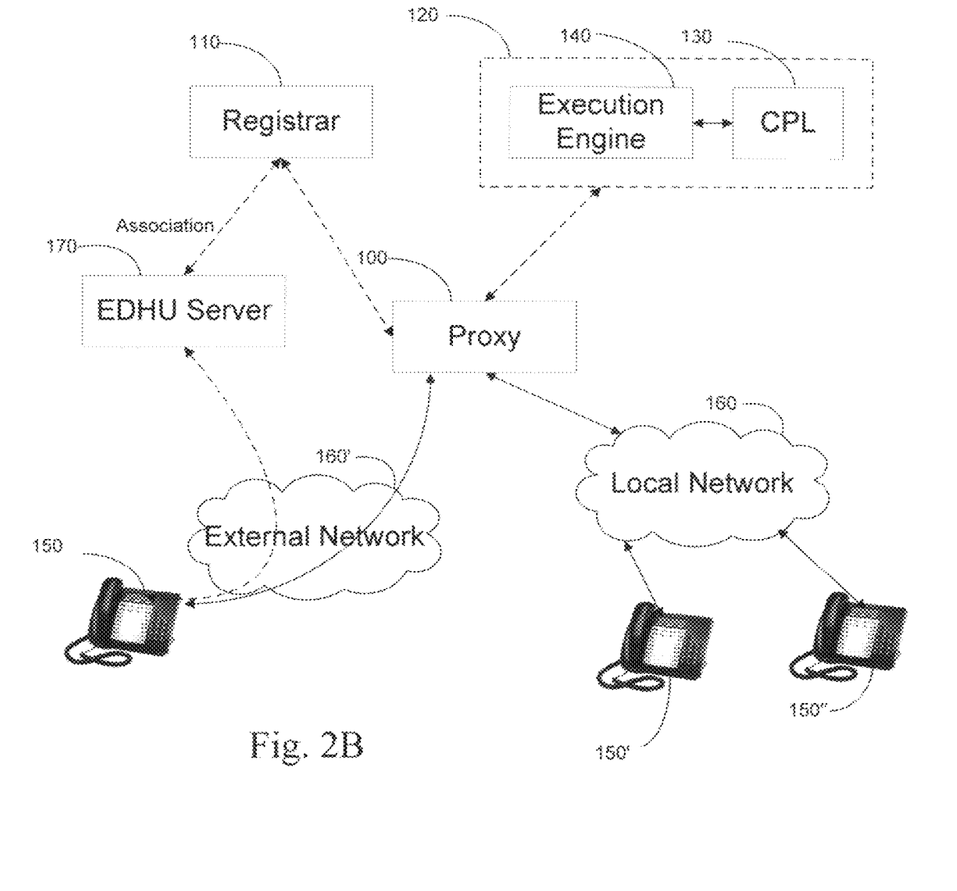
FIG. 2B is a block diagram showing a system for handling loss of association applied to external hot desking, according to an exemplary embodiment.
Figure 2C:
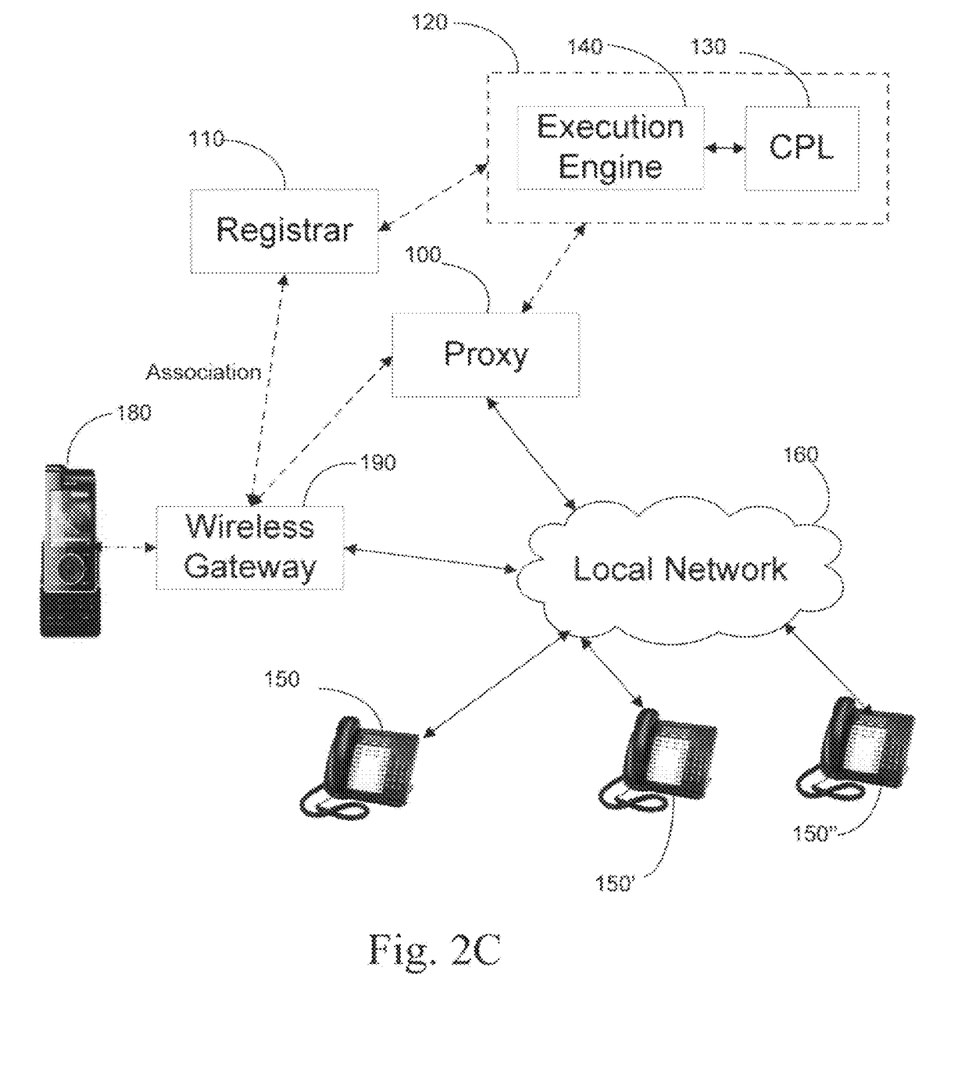
FIG. 2C is a block diagram showing a system for handling loss of association applied to a local wireless connection in which a user with a roaming device may connect to a local network through a wireless gateway, according to an exemplary embodiment.

The association between user and device can take a number of forms to satisfy user needs for different forms of interaction. FIGS. 2A through 2C represent system aspects of a number of these forms. FIG. 2A is a block diagram showing how an association can be performed for local hot desking or IP telephone registration. FIG. 2B is a block diagram showing how external hot desking can be created, wherein an external device 150 is provided with services as if it were a local device 150', 150'', etc. FIG. 2C is a block diagram showing a local wireless connection in which a user with a roaming device 180 may connect to a local network 160 through a wireless gateway 190.

In FIG. 2A, VoIP telephone registration is accomplished via a SIP registration server 165 that may be included as part of the telephone device 150 or may be provided as a separate device or part of a separate device. Registration may be performed either manually or automatically. In the manual case, a user may enter information such as a user ID and PIN on a keypad of the device 150 or may enter the equivalent information on another device such as a personal computer or thin client that is associated with the telephone device 150. Data may also be entered via a smart card (e.g. magnetic stripe, RFID, JAVA card etc.) inserted in a card slot of the device 150 or read remotely by use of RF or magnetic technology. Automatic registration can be performed through the application of location or biometric technology such as thumb print data, retina scan technology etc. For example, a user may be registered on a meeting room telephone automatically if a location system (not shown) detects that the user is in the room. Alternatively, facial recognition can determine the identity of a user who is at the location of a telephone device 150 and in response automatically trigger registration.

As discussed above, loss of association in the scenario of FIG. 2A may be intentional, in which case the user may be desirous of maintaining the current call and moving it to another device. This can occur in a variety of circumstances. A user may wish to move a call from a fixed telephone in a meeting room to his/her local wireless or cellular telephone so that he/she can maintain the call while moving. Another possibility is that the user may wish to move the call from one fixed telephone to another fixed telephone. For example, the user may be on a conference call in a meeting room and wish to move the call to his/her desk telephone in order to access documents that reside in his/her office. A particular complication arises in the foregoing case in that there may be multiple users associated with the meeting room telephone (e.g.

conference call). The user may wish to move his/her participation in the call to another device without affecting the other participants' interaction with the call in any way. In such a situation, the user may remove his/her identity card from the device to end his/her association but wish the call to be preserved on the current device while he/she moves to another device. Alternatively, it is contemplated that the user could send a command to the system via the device 150 to remove his/her association (e.g. out-of-band digital message or a DTMF feature access code). In any event, the removal of user registration is reported to the registrar 110 by the registration server 165 removing the registration. The registrar then sends an indication of the removal of registration to the device 150 which is provided with default behavior resulting from loss of association (i.e. in prior art SIP systems, since the CPL document provides no specification for call disposition, the application server 120 follows the default behaviour associated with the proxy 100, to maintain the call association until a disconnect signal is received).

Registration of an external telephone 150 or other device in the example of FIG. 2B may be accomplished using the techniques described in for example, U.S. Pat. No. 5,454,032, (incorporated by reference) by initiating connection through the network to an External Hot Desking Unit (EDHU) server 170. A user ID and PIN can be supplied for authenticating a user with the EDHU server 170 to initiate a registration of the user on the proxy 100.

Loss of association in the case of external hot desking, as illustrated in FIG. 2B, may result from an intentional user act similar to that described for local hot desking discussed above in connection with FIG. 2A. However, loss of association may also be unintentional such as in the case where there is a loss of connection between the remote site and the EDHU server 170 due to a failure in the network 160'. In either case, the EDHU server 170 removes the registration from the registrar 110 and the registrar reports this to the application server 120 for default call handling (i.e. maintain the current call on the same device 150 thereby coupling the association of the call with the device).

Registration of association of a user wireless device 180 with the system in the example of FIG. 2C gives rise to a dynamic connection, as discussed above. A wireless protocol implemented within gateway 190 searches for and establishes communication with an available base station through which the user can access the system. As the user moves and/or the RF environment changes, the device connection moves between different base stations, in a well known manner.

The variable state of the RF environment may cause loss of association by the complete loss of connection between the user device 180 and the wireless gateway 190. This is similar to the loss of association due to network failure for the external hot desking example of FIG. 2B. Likewise, when such a loss of connection occurs, the wireless service 190 removes the registration of the wireless device 180 from the registrar 110. Moreover, in wireless systems the RF environment can create situations in which wireless communication with the device 180 is possible but the number of errors reduces voice quality to an unacceptable level. In such situations, it may be desirable to suspend the current call and attempt reconnection to the user on a new channel that has a better quality connection.

The various associations set forth in FIGS. 2A-2C provide different modes of communication between users. A user who is remote from the office accesses his/her colleagues and other communication equipment according to a different mode than a user who is on the local network. Therefore, user options and preferences for coping with loss of association will differ for each of the associations depicted in FIGS. 2A-2C.

Moreover, as discussed above, loss of association may be intentional or unintentional on the part of the user. Loss of association can result from circumstances beyond user control or can be initiated by the user. For example, the wireless configuration of FIG. 2C is notoriously fragile and it is not uncommon for wireless devices to lose connection to the system. On the other hand, in the hot desking case of FIG. 2A, a user can remove his/her association with device 150 intentionally and wish the system to interpret this as an instruction to conform to user preferences on how to handle the currently active call. The possibility of intentional and intentional loss of association requires an ability to specify multiple user preferences for behavior on loss of association.

Figure 3:
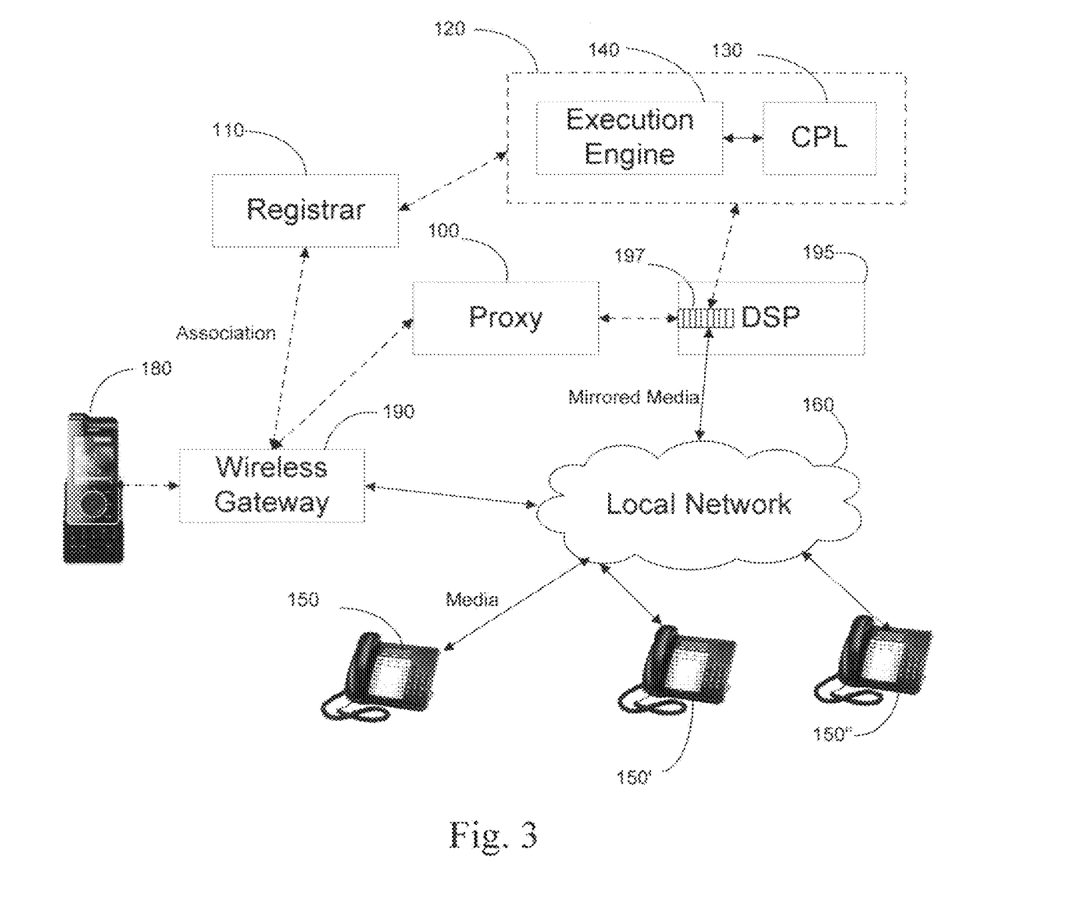
FIG. 3 is a block diagram showing a system for handling loss of association applied to a local wireless connection provided with a digital signal processor for detecting low voice quality on a local wireless connection, according to an exemplary embodiment.

The following description of an exemplary embodiment refers to the example of FIG. 2A, but is equally applicable to the examples of FIGS. 2B and 2C, and FIG. 3. In the context of FIG. 2A, a method is set forth for implementation within application server 120 to respond in the event of loss of association according to user preferences set forth in a policy language (referred herein to as extended CPL, set forth below) executed by execution engine 140 such that SIP proxy 100 is provided with an appropriate user prescribed behavior in the event of loss of association. Thus, the policy engine 140 and proxy 100 interact to provide either a user prescribed or a default behavior.

As discussed above in connection with Table 1, the CPL policy language (RFC 3880) already functions to describe and enforce user preferences for both incoming and outgoing call attempts. This is done in conjunction with the default behaviour of proxy 100, which cooperates with the application server 120 so that user preference scripts can be uploaded and otherwise managed. Consequently, the exemplary embodiment set forth herein builds on conventional CPL as a base to which new extensions are added and existing elements are modified to create appropriate loss of association behavior. Accordingly, the exemplary embodiment of policy language set forth herein is referred to as Extended CPL or ECPL.

CPL provides for handling of user preferences relating to incoming and outgoing calls by the elements <incoming> and <outgoing>, which delimit user preferences during these call states. However, losses of association occur during the middle of a call (i.e. midcall). Therefore, a new element is set forth denoted as "midcall" to delimit user preferences for the handling of events during the midcall state.

CPL is ambiguous as to the distinction between a call state and an event. Specifically, CPL accommodates user preferences for outgoing and incoming call states but only a single event (the occurrence of an outgoing or an incoming call) is supported in each of these states. According to ECPL, as set forth in greater detail below, multiple events may be supported in the midcall state.

According to a first aspect of ECPL, there is provided an "event" element having a single attribute called Type. The value Type is used to represent any one of multiple defined events. For example, as described below, a single event called "loss_of_association" may be interpreted as a reported loss of association for any device. Other events, such as a specific events denoting unacceptable RF performance, may also be supported, as discussed below. Additionally, DTMF reception events may be used for manual removal of association, transfer or any appropriate midcall feature.

According to a second aspect of ECPL, a "distant_switch" element is provided for making decisions based on the identity of a distant party or parties who are present in a call. As discussed above in connection with Table 1, the existing CPL specification provides an address switch that can make decisions on various fields within the origin and destination addresses of the INVITE message for an incoming or outgoing call attempt. By use of various subfields, switching may occur by user name (using the user subfield) or affiliation (using the host subfield). However, for midcall events the distinction between an incoming and outgoing call attempt event is not valid. Therefore, the "distant_switch" element of ECPL makes decisions based on the identity of the distant party of parties who are present in the call. Various parameters are set forth herein to facilitate this identification, including "name" and "affiliation", wherein the execution engine 140 accesses a directory (not shown) containing a linkage between the address and the names and affiliations of a user's contacts. The application running in engine 140 is therefore aware of the address to which a call has been set up and uses that address to extract the name, affiliation, etc. of the distant party in a call. As discussed in greater detail below, comparisons are made with strings that are associated with the above-described parameters such that if the string is contained within the parameters a match is made.

Location is a currently defined tag within the CPL specification for managing a list of URIs to which a device is programmed to be proxied, redirected, etc. Location is always specified as an explicit URI. For of this disclosure, it is assumed that connections are moved from one device owned by the user to another device owned by the user. It is therefore desirable that the user be able to specify the device in a manner that does not depend on its specific identity since the identity may change as devices are registered and de-registered. For example, a user may have multiple mobile devices that are not all in use simultaneously. In case of a loss of association from one such device, the user may wish to move the connection to one of his/her other mobile devices. The user therefore registers these devices within his/her contacts on the registrar 110. If specific URIs are required for "location" in the ECPL script then the user must ensure that the ECPL script is updated with the same new contacts by means of location elements. As a result of the ability to specify by class, the user in this example need only specify a location of type "mobility", and no interaction is required between contact registration and the ECPL script management. This provision also makes the selection process more explicit in terms of the types of services that are desired on the "moved" connection. Thus, a user may wish to move the association to his/her secretary as specified by an "actor" parameter (discussed below). If the secretary assigned to the user changes during the day (e.g. lunch coverage, etc.), the complicated process of recognizing such a change and updating the CPL script is avoided.

According to an exemplary embodiment, a URL parameter "self" is reserved to indicate that a specified device is among those already registered in the user's contact list. As indicated above, a user is able to specify the device by media feature tags to avoid complicated interactions with the contact registration process.

According to the exemplary embodiment, the class of device is defined in a similar manner as the media feature tags contact list specification of RFC 3840 (Indicating User Agent Capabilities in the Session Initiation Protocol (SIP)). Examples of tags defined in section 10 of that document are:

Mobility—In RFC 3840, this has two possible values: "fixed" and "mobile", which indicate whether or not the device is wireline or wireless. For the purposes of this disclosure, the value "mobile" has been supplemented by values which indicate whether the wireless device is suited for local wireless or cellular service. According to the exemplary embodiment, the values are "local" and cellular". Thus, while the values of "fixed" and "mobile" are retained, and "Fixed" maintains the same semantics as in RFC 3840, "Mobile" takes the semantics of either a local or cellular wireless device.

Class—this has two values with obvious implications: "business" and "personal" (e.g. a user would likely not want to move a call from a business associate to a personal device that a child might answer).

Actor—this has four possible values: "principal", "attendant", "msg-taker" and "information". Principal indicates a device associated with the human user. Msg-taker is a person or device which can accept messages on behalf of the human user (e.g. a user voice mail box). Information refers to a device that can provide information about the human user (e.g. to supply information on the loss of association). Attendant is a device or human being which or who can assist in contacting the human user (e.g. a user's secretary who can assist the user in regaining contact with the user).

Other tags are defined in section 10 of RFC3840 that may be of use in implementing aspects of the invention. The list defined in RFC3840 is not exhaustive and other tags may be defined, as would be understood by a person of ordinary skill in the art.

As discussed above, there are circumstances in which a user may wish to move from one device to another while maintaining an association with a call-in-progress. For example, a user in a meeting room may wish to move to his/her desk phone in order to continue the call while having access to documentation accessible in the office. The movement of the call must not be instantaneous and must occur when the user reaches the new phone. This can be accommodated if the movement is directed to the next telephone that the user registers, rather than an existing telephone in the contact list. Therefore, according to the exemplary embodiment, "Subsequent" is reserved in the location element to indicate the next device on which the user registers.

The device that a user is using at the time of loss of association can be indicative of the device to which the user will want the device moved. For example, a user may intentionally remove the association from a fixed device if he/she is desirous of moving the call to a mobile device. Consequently, a "device" parameter is provided according to the exemplary embodiment.

The CPL specification currently supplies proxy and redirect elements to indicate how a call being set up should be directed to an endpoint. These are unsuitable for the midcall case with which this disclosure is concerned since, in the midcall case the reconnection must be handled in such a way that other parties in the call will not be adversely affected by the call movement. Proxy and redirect are used to set up a new call, not to work within an existing call.

First, in order to meet the requirement of not disturbing the existing call, the new call leg must be connected to the current call in the same way as the existing one. In this way, the same web of conferencing that marks large IP telephony calls will be maintained. Second, there are cases in which it is desirable for the existing call leg to be maintained even though the call has been moved. One example of this is a group of people interacting with a call by use of a speakerphone or conference unit. The current owner of the phone might wish to leave and maintain contact by means of his/her wireless device. If the existing call were to be dropped, the group of people on the conference would be inconvenienced. Also, it is known in the art to provide twinning of a cell phone and a fixed device (e.g.

"Mobile Extension" from Mitel Networks Corporation) to maintain the call on one of the cell phone and a fixed device while it is being moved to the other. Third, "proxied" and "redirected" calls will be subject to any feature treatment (e.g. forwarding, etc.) that is active at the remote location. In the embodiments discussed above, the user is directing the call to a specific device and so would not want previously set up call treatments to interfere with his/her current direction. Thus, in certain embodiments, feature handling for these new connections will be disabled. However, there may be cases in which legacy equipment is used and this condition is not possible such that the user is required to ensure that his/her preferences for loss of association are compatible with the feature treatments on the devices to which he/she will direct calls.

With these requirements, a new element is set forth according to the exemplary embodiment, denoted as "move", to take an existing call leg and extend it to the endpoint indicated in the location element. This can be done by an internal switching capability within the proxy 100. A parameter denoted "conference" is also provided that can assume a value "yes" to indicate that the new and extended call legs should be conferenced together or "no" to indicate that the existing call leg should be dropped. The proxy 100 can provide the conferencing capability, as is well known in the art. The existing "timeout" parameter and "busy", "timeout" and "failure" sub-elements of CPL and the redirect elements are also supplied with the existing semantics.

In order to further describe the operation and use of the method and system for transition of association between communication devices according to the exemplary embodiment, reference will be made to several applications.

In a first application, the exemplary method and system are applied to an intentional loss of association in which a user on a fixed telephone 150 wishes to move the connection to his/her wireless telephone 180. An exemplary ECPL script for implementing the midcall element is provided in Table 2, as follows:

TABLE 2

```
<midcall>
  <subaction id = "subsequent">
    <location url = "subsequent">
      <move/ conference = "no">
    </location>
  </subaction>
  <event type = "loss_of_association">
    <device mobility = "fixed">
      <location url = "self" , mobility = "mobile">
        <move timeout = "10" conference = "yes">
          <busy> <sub ref = "subsequent"> </busy>
          <noanswer> <sub ref = "subsequent"> </noanswer>
          <failure> <sub ref = "subsequent"> </failure>
        </move>
      </location>
    </event>
</midcall>
```

In a second application, set forth in Table 3, below, the exemplary method and system are applied to handling a call on wireless device 180 where there has been an unintentional loss of association, and wherein the loss of association is handled according to the classification of the distant party.

Thus, with reference to FIG. 3, a configuration is shown for detecting low voice quality on a local wireless call. The proxy 100 is involved in the setting up of connections to all devices on which the user is registered, as is known in the art. As discussed above, the SIP specification (RFC3251) provides that registered devices may be supplied with classification tags. Among these is a tag that indicates that a device is mobile. Additional tags may be added to indicate if the device is a local wireless or cellular device. For devices that are local wireless, the proxy 100 may be programmed to mirror the packet stream from the device 180 so that the packet stream goes both to the distant party as well as to a DSP 195 for detecting poor voice performance.

The DSP 195 may use any of a number of techniques for detecting a poor wireless connection. First, the DSP is provided with a jitter buffer 197 to receive the incoming voice packet stream. If the jitter buffer empties or if the number of queued packets varies more than a predetermined amount (as would be understood by a person of skill in the art), this provides an indication of errors resulting from the wireless environment or from the network 160 connected to the wireless environment due to congestion or other reasons. Alternatively, the DSP 195 may detect a poor wireless environment in situations wherein the received voice is impaired by persistent bursts of noise. The DSP 195 can use these and other indicators to report a loss of association to the applications server 120.

In response, according to the exemplary script of Table 3, if the call is from a colleague in the user's company ("Mitel" in the example of Table 3), there is no need for the call to proceed. The user's preference is for the colleague to be provided with an announcement to inform his/her colleague that the call has failed. However, if the call is from a specific important customer ("John Doe" in the example of Table 3), the user prefers that the call be sent to the user's cellular telephone. If the user's cellular telephone is unavailable, the user wishes for the customer call to go to his/her assistant.

TABLE 3

```
<midcall>
  <subaction id = "assistant">
    <location url = "self" actor = "attendant" clear = "yes">
      <move/ conference = "no">
    </location>
  </subaction>
  <event type = "loss_of_association">
    <device mobility = "local">
      <distant_switch affiliation = "Mitel">
        <location url = "self" actor= "information" clear = "yes">
          </move>
        </location>
      </distant_switch>
      <otherwise>
        <distant_switch name = "John Doe">
          <location url = "self" mobility = "cellular" clear = "yes">
            <move timeout = "10" conference = "no">
              <busy <sub ref = "assistant">
              <no answer sub ref = "assistant">
              <failure sub ref = "assistant">
            </move>
          </location>
        </distant_switch>
      </otherwise>
    </distant_switch>
```

A person of ordinary skill in the art will appreciate from the foregoing that other elements of the ECPL specification may be used to further refine the policies that guide behavior relating to loss of association. For example, the user may specify different performance by use of a time switch. A call may be moved to his/her assistant during normal business hours and to an announcement otherwise. The user may also specify different handling of his/her external hot desk telephone as opposed to his/her local telephone. The user may request that a call be sent to his/her local wireless device 180 in the event of loss of association on his/her local telephone 150. Since this would not be of use for an external hot desk telephone (FIG. 2B), he/she may specify other handling.

Figure 4:
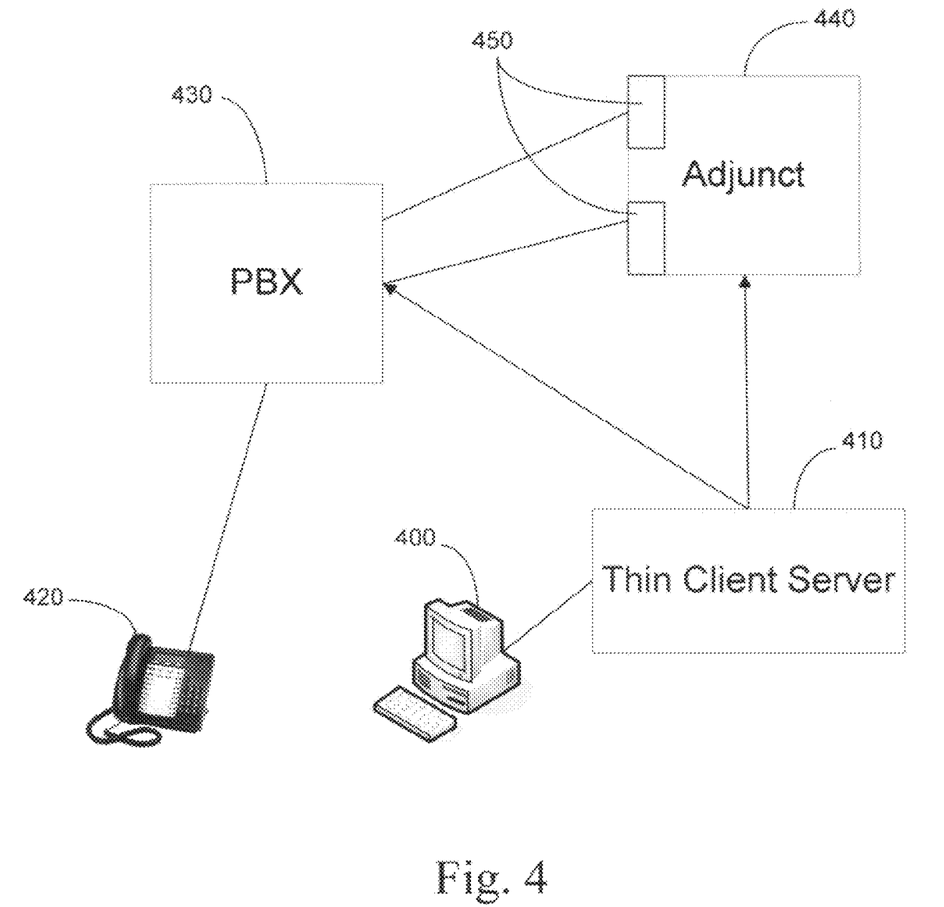
FIG. 4 is a block diagram of a system for handling loss of association in between a thin client device served by a thin client server and an associated telephone connected to a PBX coupled with a feature adjunct, according to a an exemplary embodiment.

The exemplary embodiment has been described above in terms of a SIP-based configuration. However, the principles set forth herein are not restricted to SIP. For example, the system of FIG. 4 shows a thin client device 400 (e.g. desktop computer) served by a thin client server 410, and an associated telephone 420 connected to a PBX 430. The PBX 430 is, in turn, coupled with a feature adjunct 440 via line circuits 450 to provide line appearances and media looping, as is known in the art. The telephone 420 and the thin client device 400 may be provided in the same office or on the same desk. In order to use the thin client device, a user registers on the server 410, for example, by inserting a card (e.g. JAVA card, a magnetic stripe card, etc.) into a reader on the device 400. Thus, a transient user may register on the telephone 420 to obtain hot desking services whereby the PBX 430 associates his/her preferences to the telephone (represented in FIG. 4 by the line between the thin client server 410 and the PBX 430). The thin client server 410 accesses the PBX 430 through an XML port or similar CTI interface in order to "hot desk" the user who has registered via the thin client device 400. In this context, PBX 430 provides the function of registrar 110 and thin client server 410 provides the function of registration server 165 in FIGS. 1-3.

In the context of the exemplary method and system, it is contemplated that a user on the hot desked telephone 420 may wish to move an established call to his/her wireless device or to another hot desked telephone at another location, as in the example discussed above in connection with Table 2. Thus, the user may remove the card from the reader, which results in de-registration being reported to the thin client server 410 which, in response, ends the association between the thin client and the user. The thin client server 410 then reports this de-registration to the PBX 430 through an XML or other CTI port for terminating the hot desking association between the user and the telephone 420. However, according to an aspect of this specification the PBX 430 is provided with an application server (i.e. functionality similar to that of server 120 in FIGS. 1-3) for running an appropriate ECPL script (e.g. as set forth above in Table 2), by which user preferences on handling the active call at the time of de-registration may be enforced.

In the event PBX 430 does not support ECPL or a similar policy system, an association may be set up between the line serving the hot desked telephone 420 and one of the lines serving the adjunct 440. Specifically, PBX 430 may set the hot desked telephone 420 as a line appearance on one of the lines serving the adjunct 440. At the time of de-registration, the thin client server 410 then informs both the PBX 430 and the adjunct 440 of the user's action. As discussed above, the PBX 430 then ends the hot desking association. However, the adjunct 440 invokes its line appearance so as to be conferenced with the existing call. The adjunct 440 may perform this, for example, by simulating the signalling of a conventional digital set over the line.

The adjunct 440 may therefore be equipped with an ECPL policy system or may be provided a fixed mechanism of handling user preferences to determine which endpoint a call exhibiting loss of association should be directed (i.e. functionality similar to that of server 120 in FIGS. 1-3). In one implementation, the adjunct 440 may use a conventional PBX 'transfer conference' feature by signalling the PBX 430 that the call on the line should be moved using a blind transfer to the appropriate endpoint. Alternately, the adjunct 440 may signal on another line circuit requesting connection to desired endpoint and then make an internal media connection between the original line carrying the call that has exhibited loss of association and the line connected to the desired end point.

Although the description of the configuration in FIG. 4 relates to registration of a user on thin client device 400 so as to automatically "hot desk" the user on an associated telephone 420, it is also possible for hot desk registration of the user on PBX 430 to automatically register the user on the associated thin client device 400 (i.e. the interconnection between the PBX 430 and thin client server 410 can be used in the opposite direction to that described above). Thus, the hot desking feature of the PBX 430 can be extended to signal the thin client server 410 to register the user on device 400.

In summary, a method and system are set forth for handling an existing call in response to one of either an intentional or unintentional loss of association. According to an exemplary embodiment, a policy language (referred to herein as ECPL) executes user preferences in the event of loss of association. One application of the exemplary embodiment relates to handling loss of association in a configuration wherein a thin client is coupled with a telephone to provide for association.

Persons skilled in the art will appreciate that there are yet more alternative implementations and modifications possible for implementing the embodiments, and that the above implementations and examples are only illustrations of one or more embodiments. For example, it is contemplated that the policy language may include a policy indication to request a decision from the user on how to handle a loss of association during the mid-call state. For example, an XML document may be provided with possible options for handling loss of association and an element to instruct the execution engine 140 respond in a manner appropriate to the user device and user preference. The scope, therefore, is only to be limited by the claims appended hereto.

What is claimed is:

1. A system for transitioning an association between a user and a first communication device involved in a call to at least one other communication device, comprising:
    a generated signal in the event of a loss of said association in mid-call; and
    an application server for receiving said signal and in response transitioning said association to a second communication device, said application server comprising an execution engine and a policy document for storing and executing user call handling preference scripts upon receiving said signal, said policy document comprising:
        a mid-call element for delimiting user preferences for handling of events during the mid-call state;
        an event element for representing any one of a plurality of defined mid-call events;
        a location element for identifying said second communication device; and
        a move element for transitioning said association from said first communication device to said second communication device specified by said location element.

2. The system of claim 1, wherein said policy document further includes a device element having a mobility parameter for indicating mobile capabilities of said first communication device and said second communication device.

3. The system of claim 1 wherein said association is meditated by at least one of a registrar, a hot desking feature or wireless roaming.

4. The system of claim 1, wherein said move element further includes a conference parameter for transitioning said association from said first communication device to said second communication device as a conference with at least one further user of at least one further communication device.

5. The system of claim 1, wherein said event element includes a type attribute for indicating at least one of said loss of association, unacceptable network performance, or DTMF reception events for initiating transition of said association.

6. The system of claim 1, wherein said policy document further includes a distant_switch element for facilitating said transition from said first communication device to said second communication device based on identity of at least one party registered to said second communication device.

7. The system of claim 1, wherein said location element includes a subsequent parameter for indicating said second communication device.

8. The system of claim 1, wherein said location element includes a self parameter for indicating that said second communication device is registered in a contact list for said user.

9. A method of transitioning an association between a user and a first communication device involved in a call to at least one other communication device, comprising:
   generating a signal in the event of a loss of said association in mid-call; and
   receiving said signal and in response transitioning said association to a second communication device; and
   executing user call handling preference scripts upon receiving said signal, said call handling preference scripts comprising:
      a mid-call element for delimiting user preferences for handling of events during the mid-call state;
      an event element for representing any one of a plurality of defined mid-call events;
      a location element for identifying said second communication device; and
      a move element for transitioning said association from said first communication device to said second communication device specified by said location element.

10. The method of claim 9, wherein said signal is generated responsive to user input.

11. The method of claim 9, wherein said signal is generated responsive to at least one of a loss of connection or the occurrence of unacceptable transmission performance at said first communication device.

12. A system, comprising:
   a thin client server;
   a thin client device connected to said thin client server;
   at least one telephone collocated with said thin client device;
   a PBX connected to said thin client server and to which said at least one telephone is connected;
   a feature adjunct connected to said PBX and said thin client server;
   a card reader on said thin client device to receive a user card for one of either registering a user with said thin client server in response to which said thin client server registers said user on said thin client device and causes said PBX to register said user on said telephone, or registering said user with said PBX which in response registers said user on said thin client device; and
   an application server within one of said PBX and said adjunct for storing and executing user call handling preferences in the event of a loss of association during a mid-call state between said collocated telephone and said thin client device and at least one further communication device coupled to said PBX, to transition said association to a second communication device.

13. The system of claim 12, wherein said application server causes said adjunct to transition said association by signalling said PBX to perform a blind transfer of said association to said second communication device.

14. The system of claim 12, wherein said first communication device is a wireless communication device and said system further a wireless gateway for facilitating communication between said wireless communication device and a data network, wherein a proxy establishes a packet stream between said wireless gateway and said data network, and wherein said system includes a digital signal processor for receiving a copy of said packet stream from said proxy and detecting poor voice performance thereon.

15. The system of claim 14 wherein said digital signal processor includes a jitter buffer to receive said packet stream and indicates said poor voice performance in the event said jitter buffer empties or the number of queued packets therein varies more than a predetermined amount.

16. The system of claim 12 wherein said PBX further includes a hot desking component for signalling said thin client server to register the user on said thin client device.

17. A system for transitioning an association between a user and a first communication device involved in a call to at least one other communication device, comprising:
   a generated signal in the event of a loss of said association in mid-call; and
   an application server for receiving said signal and in response transitioning said association to a second communication device, said application server comprising an execution engine and a policy document for storing and executing user call handling preference scripts upon receiving said signal, said policy document comprising:
      a mid-call element for delimiting user preferences for handling of events during the mid-call state;
      an event element for representing any one of a plurality of defined mid-call events;
      a location element for identifying said second communication device;
      a move element for transitioning said association from said first communication device to said second communication device specified by said location element; and
      a distant_switch element for facilitating said transition from said first communication device to said second communication device based on identity of a distant party present in the call.

18. The system of claim 17, wherein said policy document further includes a device element having a mobility parameter for indicating mobile capabilities of said first communication device and said second communication device.

19. The system of claim 17, wherein said association is meditated by at least one of a registrar, a hot desking feature or wireless roaming.

20. The system of claim 17, wherein said move element further includes a conference parameter for transitioning said association from said first communication device to said second communication device as a conference with at least one further user of at least one further communication device.

21. The system of claim 17, wherein said event element includes a type attribute for indicating at least one of said loss of association, unacceptable network performance, or DTMF reception events for initiating transition of said association.

22. The system of claim 17, wherein said location element includes a subsequent parameter for indicating said second communication device.

23. The system of claim 17, wherein said location element includes a self parameter for indicating that said second communication device is registered in a contact list for said user.

24. A method of transitioning an association between a user and a first communication device involved in a call to at least one other communication device, comprising:

generating a signal in the event of a loss of said association in mid-call; and receiving said signal and in response transitioning said association to a second communication device; and executing user call handling preference scripts upon receiving said signal, said call handling preference scripts comprising:

a mid-call element for delimiting user preferences for handling of events during the mid-call state;

an event element for representing any one of a plurality of defined mid-call events;

a location element for identifying said second communication device;

a move element for transitioning said association from said first communication device to said second communication device specified by said location element; and a distant_switch element for facilitating said transition from said first communication device to said second communication device based on identity of a distant party present in the call.

25. The method of claim 24, wherein said signal is generated responsive to user input.

26. The method of claim 24, wherein said signal is generated responsive to at least one of a loss of connection or the occurrence of unacceptable transmission performance at said first communication device.

* * * * *